United States Patent [19]
Wyczalek et al.

[11] 3,965,681
[45] June 29, 1976

[54] INTERNAL COMBUSTION ENGINE AND TURBOSUPERCHARGER THEREFOR WITH HEAT PIPE FOR INTAKE MIXTURE HEATING

[75] Inventors: Floyd A. Wyczalek, Birmingham; John L. Harned, Grosse Pointe Woods; Ora M. Smith, Romeo, all of Mich.

[73] Assignee: General Motors Corporation, Detroit, Mich.

[22] Filed: June 30, 1975

[21] Appl. No.: 591,274

[52] U.S. Cl. .................. 60/599; 60/604; 123/122 A; 123/122 AB; 123/122 AA
[51] Int. Cl.² .......................... F02B 29/02
[58] Field of Search ..... 123/119 C, 122 AB, 122 A, 123/122 AA; 60/604, 599

[56] References Cited
UNITED STATES PATENTS
2,991,616  7/1961  Miller ........................ 60/599
3,029,594  4/1962  Miller ........................ 60/599

FOREIGN PATENTS OR APPLICATIONS
545,295  5/1942  United Kingdom ............. 60/604

Primary Examiner—Charles J. Myhre
Assistant Examiner—R. H. Lazarus
Attorney, Agent, or Firm—Robert J. Outland

[57] ABSTRACT

An internal combustion engine is provided with a turbosupercharger including a vaned rotatable compressor wheel arranged in an inlet passage to compress inlet mixture for delivery to the engine combustion chamber, a vaned turbine wheel arranged in an exhaust passage to be driven by the flow of engine exhaust gases, a shaft interconnecting the turbine and compressor wheels for rotation together on a common axis, and vaporizable fluid heat transfer means in the form of a heat pipe extending through the shaft between the turbine and compressor wheels for transferring exhaust heat from the turbine wheel to the compressor wheel to heat the engine inlet mixture.

3 Claims, 1 Drawing Figure

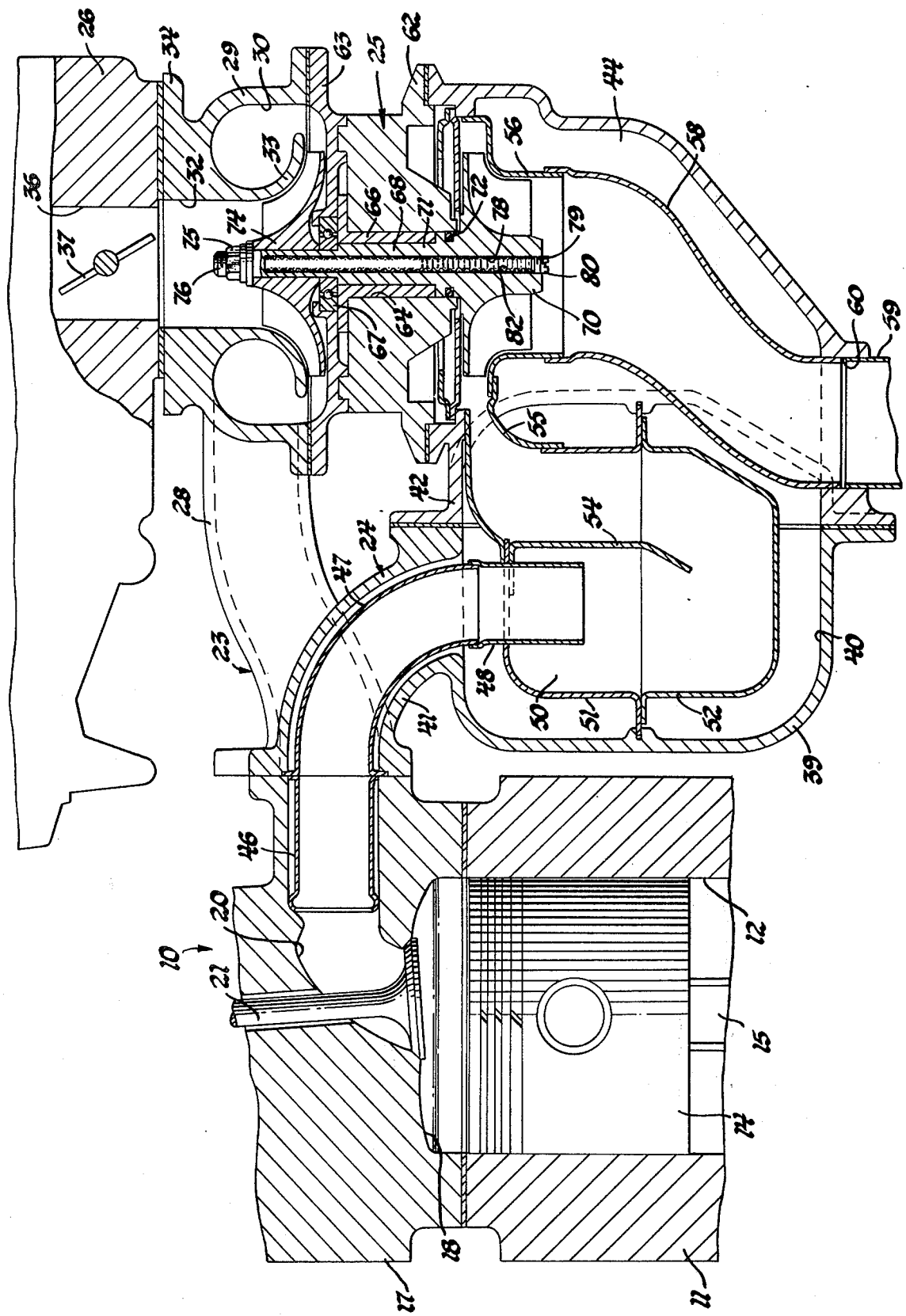

INTERNAL COMBUSTION ENGINE AND TURBOSUPERCHARGER THEREFOR WITH HEAT PIPE FOR INTAKE MIXTURE HEATING

FIELD OF THE INVENTION

This invention relates to internal combustion engines and more particularly to an engine turbosupercharger arrangement having internal means for heating the engine intake mixture in the form of a heat pipe, or vaporizable fluid heat transfer device, extending between the turbine and compressor wheels of the turbocharger for transferring heat therethrough.

BACKGROUND OF THE INVENTION

It is well known in the field of spark ignited gasoline engines, particularly those for automotive use, to provide means for heating the intake air-fuel mixture with heat transferred from the engine exhaust gases. The heat provided warms the induction system and aids vaporization of fuel in the intake mixture, thus assisting proper distribution of the mixture to the various cylinders and improving combustion in the combustion chambers.

Many such systems have utilized juxtaposed intake and exhaust manifold arrangements wherein exhaust gases are directed against a plate or wall to which the intake manifold mixture is exposed, preferably at a point below the carburetor throat or inlet passage. The heating of the plate or wall by exhaust gases vaporizes fuel droplets impinging on the wall or plate and heats the adjacent air-fuel mixture. Control of heat transfer in such systems is generally provided by an exhaust gas diversion valve, mechanically actuated by a thermostatic, or time controlled, mechanism that provides maximum exhaust heat during the engine warm up period and substantially reduces or cuts off the heat when normal operating conditions have been reached.

SUMMARY OF THE INVENTION

The present invention provides a novel arrangement for controlled transfer of exhaust heat to the inlet mixture of an internal combustion engine provided with a turbosupercharger wherein the heat transfer device involves a two-phase thermosyphon or heat pipe, that is a vaporizable fluid heat transfer means having capillary flow of condensed fluid, for example, of the type shown in U.S. Pat. Nos. 2,350,348 Gaugler and 3,287,906 McCormick, both assigned to the assignee of the present invention. The heat pipe is integrated with the turbocharger rotor and arranged to transfer a controlled amount of heat, picked up from the exhaust gases by the vaned turbine wheel, directly to the vaned compressor wheel for transfer to the engine intake mixture.

The arrangement is simple and compact with the heat pipe heat transfer device being formed within the shaft connecting the turbocharger turbine and compressor wheels, thus adding very little to the complexity of the exhaust and induction systems. The arrangement takes advantage of the intimate contact of the vaned turbine and compressor wheels with the exhaust and intake gases, respectively, which result in the capability of high rates of heat transfer between these gases and the respective turbocharger wheels. The transfer of heat between the turbocharger wheels by a heat pipe further provides the capability of rapid warm up, with control of maximum heat transfer, these factors being determinable in the design by selection in known manner of a heat pipe heat transfer fluid having a suitable vaporization temperature, as well as by the amount of fluid utilized and the manner of transporting it within the heat pipe.

These and other features and advantages of the invention will be more fully understood from the following description of a preferred embodiment taken together with the accompanying drawing.

BRIEF DESCRIPTION OF THE DRAWING

The single FIGURE of the drawing shows a cross-sectional view of a portion of a turbocharged spark ignition gasoline fueled internal combustion engine having a turbocharger with integral heat pipe heat transfer means mounted within and supported by the engine intake and exhaust manifolds in accordance with the invention.

GENERAL DESCRIPTION

In the drawing, numeral 10 generally indicates a spark ignited gasoline fueled turbocharged internal combustion engine of a type suitable for use in automotive vehicles. Engine 10 includes a cylinder block 11 defining in known manner a plurality of cylinders 12, only one of which is shown. In each of the cylinders there is a reciprocably disposed piston 14 connected through a connecting rod 15 with a common crankshaft, not shown.

The upper ends of the cylinders, as shown in the drawing, are closed by a cylinder head 17 which defines, with the piston 14 and cylinders 12, a combustion chamber 18 for each cylinder. Each combustion chamber is provided with an exhaust port 20 controlled by an exhaust valve 21 in known manner, as well as with a valve controlled intake port and a spark plug which are of conventional design and are not illustrated.

Exterior to the cylinder block and cylinder, the engine is provided with an intake manifold 23 defining passages connected with the engine intake ports, an exhaust manifold 24 having passages connecting with the engine exhaust ports 20, a turbocharger assembly 25 interconnecting and integrated with the engine intake and exhaust manifolds, and a carburetor 26 mounted on the intake manifold 23 for delivering combustible air-fuel mixtures to the engine intake passages.

The intake manifold 23 includes a plurality of passage defining runners 28, only one being shown, that connect with a central portion 29 defining an annular plenum 30. Centrally of the plenum is a vertical intake passage 32 having outwardly flaring wall 33 cooperating with the turbocharger, as will be subsequently described and forming a passage leading to the annular plenum 30. A mounting boss 34 is provided on the upper surface of the central portion on which the carburetor 26 is mounted. The carburetor includes a throat 36 connecting with the intake passage 32 and provided with a conventional throttle valve 37 for controlling the flow of intake mixture from the carburetor into the manifold and engine induction passages.

The exhaust manifold 24 includes a cast housing 39 partially defining an enlarged plenum 40 that forms a portion of an exhaust reactor and a plurality of passage defining legs 41, one connecting each of the engine exhaust ports 20 with the plenum 40. A second casting 42 encloses the remainder of the plenum 40 and defines an outward extension 44 enclosing a portion of the turbocharger 25 and exhaust passage means that will be subsequently described.

Within the exhaust system are a number of sheet metal components designed to retain heat within the exhaust gases, both to aid the reaction of combustibles in the exhaust and to provide maximum energy to the turbocharger connected in the exhaust system. The sheet metal components include tubular port inserts 46 in each of the exhaust ports 20, connecting inserts 47 in each of the manifold legs 41, and inlet tubes 48 connecting the inserts 47 with the interior of a reactor chamber 50, formed by upper and lower sheet metal elements 51, 52 secured within the exhaust plenum 40. Within the chamber 50, flow is directed by a baffle 54 through a circuitous path to a sheet metal exhaust nozzle 55 connecting with the interior of a sheet metal inlet scroll 56, forming a portion of the turbocharger. The outlet of the scroll connects via a tube 58 with an exhaust pipe 59 retained in an opening 60 formed in the extension portion of the casting 42. All of the sheet metal elements above-described are, to the extent possible, spaced from the walls of the chambers and passages within which they are mounted in order to provide insulating air spaces to minimize heat transfer from the interior of the exhaust system to the housing walls.

The turbocharger assembly 25 includes a multipiece support housing including a lower portion 62 mounted on the exhaust manifold casting 42 and an upper portion 63 mounted on the lower portion 62 and connecting with the exhaust manifold central portion 29. A central opening 64 within the lower portion 62 receives a guide bushing 66 that is aligned with and supports a bearing 67 retained within the upper portion 63. The bushing 66 and bearing 67 guide and support a turbocharger rotor 68.

The rotor 68 includes a vaned turbine wheel 70 disposed within the exhaust scroll 56 so as to be rotated by exhaust gases passing therethrough. A shaft 71, which could be formed separately but is shown as being formed integrally with the turbine wheel 70, extends upwardly through the bushing 66 and bearing 67 into the interior of the intake passage 32 of the intake manifold central portion 29. A seal 72 disposed on the shaft minimizes leakage between the intake and exhaust systems. On the upper end of the shaft 71, a vaned compressor wheel 74 is secured for rotation within the intake passage 32, the wheel being retained on the shaft by a nut 75 secured to the threaded end 76.

In order to fully carry out the purposes of the invention, the interior of the turbine wheel 70 and shaft 71 are hollowed out to form an elongated cavity 78 extending through the shaft and within the turbine wheel and compressor wheel 70, 74, respectively. The open end 79 of the cavity 78 is sealed, as by a plug 80, after the installation within the cavity of a predetermined volume of vaporizable liquid such as water, a water alcohol mixture, or any suitable liquid having adequate stability and a selected vaporizing temperature intermediate the normal operating temperatures of the turbine and compressor wheels.

It is preferable, though not absolutely necessary, that the walls of the cavity 78 be lined with a suitable wick material 82 to aid in transferring liquid from one end of the cavity to the other. The sealed cavity, with or without the wick, with its body of vaporizable heat transfer fluid forms a heat pipe for transferring heat at a predetermined constant temperature from the exhaust heated turbine wheel to the compressor wheel 74 for transfer to the inlet mixture passing therethrough.

If desired, the heat pipe unit could be formed separately as a sealed capsule which could be installed within the cavity 78 in the turbocharger and retained in place by the plug 80. This form of installation would reduce somewhat the heat transfer capability through the walls of the capsule, but would have the advantage that the capsule could be replaced, if necessary, without replacing the whole turbocharger rotary unit.

OPERATION

In operation, when the engine is started, exhaust gases passing into the exhaust system and through the exhaust reactor manifold 24 are directed past the vanes of the turbine wheel 70, transferring heat thereto. If the mass of the wheel is kept small, the temperature soon rises to the point where vaporization of the heat transfer fluid begins along the portions of the cavity 78 within the turbine wheel. The vaporized fluid rises through the shaft into the portion extending within the compressor wheel 74 where it condenses on the walls of the cavity 78, transferring heat to the walls and thence to the compressor wheel 74. This heat is in turn delivered through the body and vanes of the wheel 74 to the inlet mixture passing from the carburetor through the compressor wheel into the engine intake ports, thus providing heat to the intake mixture from the exhaust gases, as desired. The amount of heat supplied is limited by selecting the temperature at which the pipe operates through choosing a heat transfer liquid with a suitable vaporizing temperature. In addition, control may be attained by limiting the amount of liquid within the heat pipe to a predetermined amount which will limit heat transfer to the desired maximum rate.

In addition to transferring heat from the exhaust gases to the intake mixture, the arrangement utilizes the energy in the exhaust gases to turn the turbine wheel, thereby rotating the compressor and increasing the pressure of the inlet mixture supplied to the engine, thus obtaining the known advantages of engine turbosupercharging.

While the invention has been described by reference to a specific embodiment chosen for purposes of illustration, it should be understood that numerous changes could be made without departing from the spirit and scope of the inventive concepts disclosed. It is accordingly intended that the invention be limited only by the language of the following claims.

What is claimed is:

1. For use in combination with an internal combustion engine, a turbosupercharger comprising
   housing and support means defining spaced inlet and exhaust passages,
   a rotatable member mounted in said support means and including a central shaft having a vaned compressor wheel at one end and a vaned turbine wheel at the other end, said turbine, shaft and compressor being rotatable as a unit within said housing and support means, said turbine being disposed within said exhaust passage and arranged to be rotatably driven by exhaust gases passing therethrough and said compressor wheel being disposed within said inlet passage and arranged to compress to a higher pressure inlet mixtures passing therethrough,
   said rotatable member having an enclosed cavity extending through said central shaft and within said turbine and compressor wheels, the walls of said cavity being in heat exchange relation with the vanes of said turbine and compressor wheels at their respective ends of said cavity and a vaporizable heat transfer fluid in said cavity, said fluid having a boiling temperature intermediate the normal operating temperatures of said turbine and compressor wheels whereby, in use, heat picked up from the exhaust gases by the turbine wheel vanes will heat and vaporize fluid disposed at the turbine wheel end of the cavity while vaporized fluid will be condensed on the cooler walls of the compressor wheel end of the cavity transferring heat through the compressor wheel vanes to the inlet mixture being compressed thereby.

2. The combination of claim 1 and further comprising wick means disposed along the walls of said cavity to retain the major portion of the liquid within the cavity and aid in its transfer from the compressor end where it is condensed to the turbine end where it is evaporated.

3. An internal combustion engine comprising means defining a variable volume combustion chamber and inlet and exhaust ports connecting with said chamber, inlet passage defining means connecting with said inlet port, means for supplying an air-fuel mixture to said inlet passage means for delivery to said engine combustion chamber, exhaust passage means connecting with said exhaust port for carrying away exhaust gases from said engine combustion chamber, a turbosupercharger mounted together with said inlet and exhaust passage means, said turbosupercharger including a rotary element having a vaned compressor wheel in the inlet passage means and a vaned turbine wheel in the exhaust passage means and a heat pipe extending between and in heat exchange relation with said turbine and compressor wheels for transferring heat picked up from the exhaust gases by the vaned turbine wheel to the vaned compressor wheel to heat the inlet mixture passing through said inlet passages.

* * * * *